July 18, 1950 V. G. R. ALLIENNE 2,515,485
POWDER DUSTER
Filed May 1, 1947 3 Sheets-Sheet 1
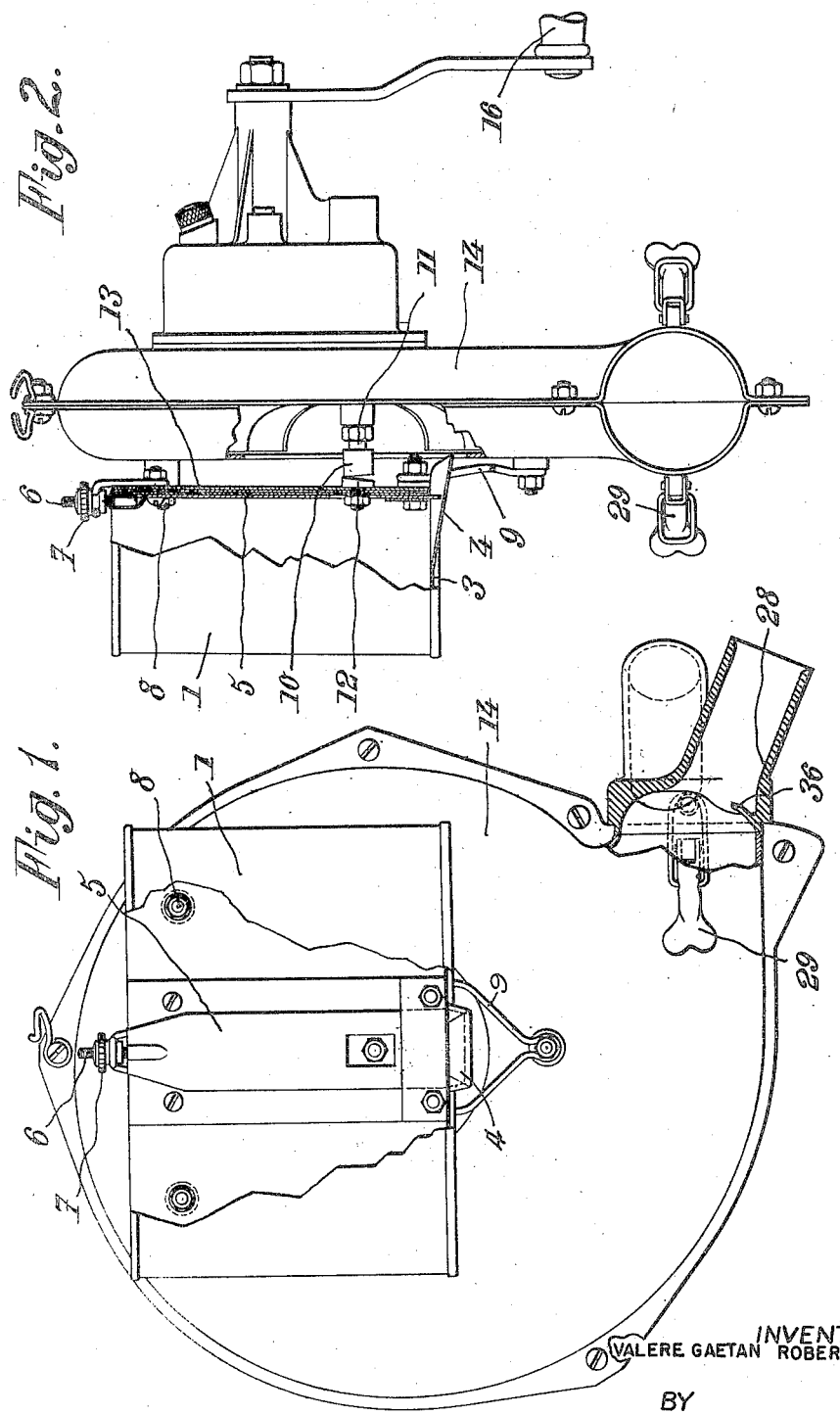
INVENTOR
VALERE GAETAN ROBERT ALLIENNE
BY
Toulmin & Toulmin
ATTORNEYS

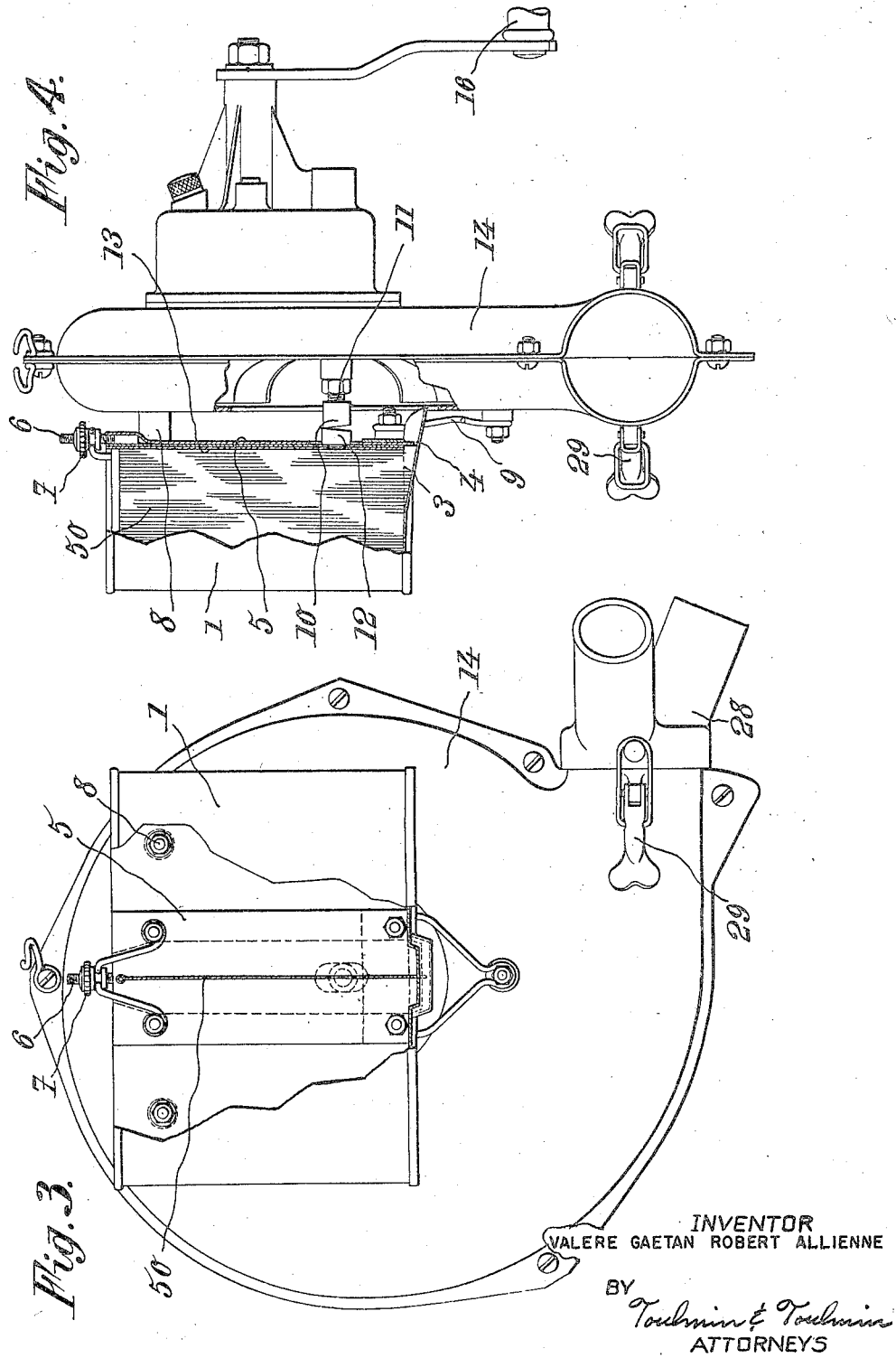

July 18, 1950 V. G. R. ALLIENNE 2,515,485
POWDER DUSTER
Filed May 1, 1947 3 Sheets-Sheet 3
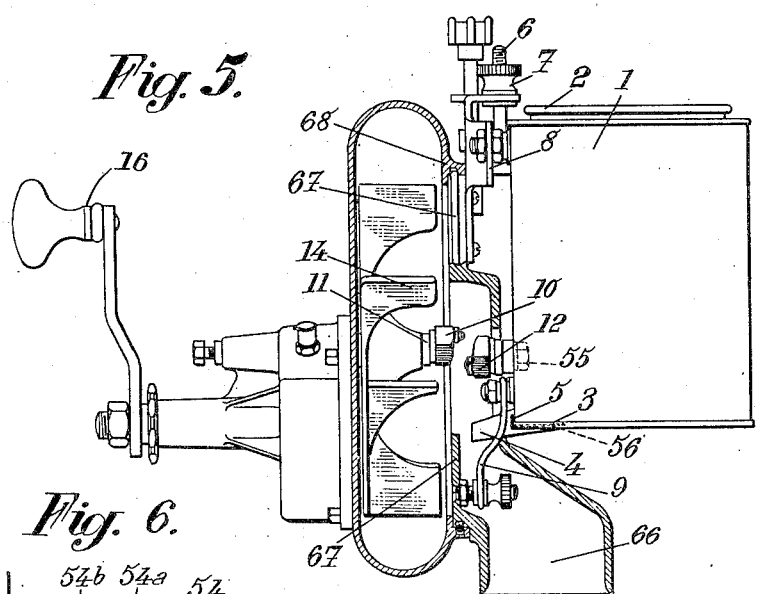
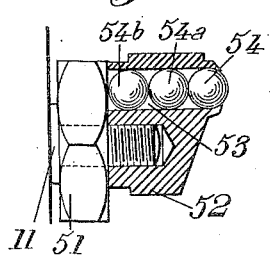
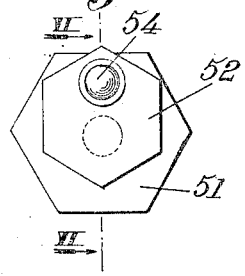
INVENTOR
VALERE GAETAN ROBERT ALLIENNE
BY
Toulmin & Toulmin
ATTORNEYS Patented July 18, 1950

2,515,485

UNITED STATES PATENT OFFICE 2,515,485

POWDER DUSTER

Valère Gaëtan Robert Allienne, Rouen, France

Application May 1, 1947, Serial No. 745,216
In Belgium April 6, 1939

Section 1, Public Law 690, August 8, 1946
Patent expires April 6, 1959

5 Claims. (Cl. 43—148)

The present invention relates to apparatus for projecting fluids, in particular pulverulent or granular materials; and it is more especially, although not exclusively concerned, with powder dusters for sprinkling plants with insecticide or microbicide powders.

Its chief object is to provide an apparatus of this kind which is better adapted to meet the requirements of practice than those used at the present time, in particular concerning safety of operation, simplicity of construction and facility of handling.

Preferred embodiments of my invention will be hereinafter described with reference to the accompanying drawings, given merely by way of example and in which:

Figs. 1 and 2 show, separately and on a larger scale, respectively in elevational and side view, with portions in section, my powder duster.

Figs. 3 and 4 show, respectively in elevation and in side view, with parts in section, a modification of the apparatus according to my invention.

Fig. 5 is a sectional axial view of an apparatus made according to still another embodiment.

Figs. 6 and 7 show, respectively in section on the line VI—VI of Fig. 7 and in end view, a cam for the apparatus of Fig. 5.

In the following description, it will be supposed that the apparatus is used to sprinkle plants such as vines or potatoes, with an insecticide powder for instance a powder against potato bugs.

For this purpose, my apparatus includes (Figs. 1 and 2):

a. At least one box or vessel 1 containing the powder;

b. Means for distributing this powder, preferably in an adjustable manner; and c. Means for creating an air stream which conveys said powder and projects it on the plants in the form of suitably directed jets.

The whole apparatus is carried by the operator.

Concerning first box 1, in the embodiment shown by the drawing it is of parallelepipedic shape and fitted with a lid 2.

The powder distributing means act on the powder container, box 1, to subject it to the action of repeated shocks which cause said powder to flow out through at least one orifice, preferably adjustable.

For instance, as shown by the drawing, I provide at the lower part of the box, an output orifice 3 with an oblique plate 4 directing the powder toward the air stream which is to drive it.

Said orifice is fitted with adjustment means such as a shutter 5 slidably mounted along one of the walls of the box, and adjustable in position by means of a screw 6 and a nut 7, said screw being easily accessible from the outside.

To ensure the desired shock action, the box is suspended to another part of the apparatus, in this example to a fan 14, to be hereinafter referred to, in such manner as to be able to undergo relative displacements. For instance it is elastically fixed at 8 and, if necessary, it is further subjected to the action of a return spring 9. Said displacements are produced through kinematic means, such for instance as a cam or thrust member 10 carried by a rotary shaft 11 and adapted to cooperate with a contact piece or thrust receiving member 12 fixed on a wall of the box, or on a piece 13 forming a support for said box, the whole being such that the rotation of shaft 11 produces an oscillatory and jerky movement of the whole of the box with respect to its suspension means 8.

Piece 13 is for instance constituted by a rigid plate fixed to the corresponding wall of the box; contact piece 12 is made sufficiently hard for resisting the repeated shocks; and cam 10 may be made of a fibrous material, so as to reduce noise, and in this case it is, of course, removable and interchangeable.

The powder driving means include the following elements:

A fan 14, against which box 1 is mounted, preferably in such manner that plate 4 is located in or opposite the suction orifice of said fan, whereby the powder is caught by the air stream; and discharge pipes for delivering the air and powder mixture to the outside, for instance toward the plants to be sprinkled with said powder. These pipes are carried by a coupling piece 28 removably secured to the fan outlet through fixation means 29. Piece 28 may be provided with a deflecting projection 36.

The fan and box are carried by the operator at the front, which permits of easily operating the fan, for instance by means of a crank 16.

Preferably, as shown by the drawing, this control crank also operates the shock producing device, shaft 11 being for instance rigid with the fan shaft. This construction is advantageous because the output of powder, which is practically a function of the frequency of the shocks, increases with the speed of the fan, this speed being for instance as high as 2000 revolutions per minute. On the other hand, the output for every shock is adjustable by means of shutter 5.

According to another embodiment of my invention, illustrated by Figs. 3 and 4, I provide, on the sprinkler, at least two containers for different respective powders, or other materials.

In this embodiment, box 1 is provided with a middle partition 50 which divides it into two compartments; the adjusting shutter may then act to adjust simultaneously the output of both powders.

According to another feature of my invention, the cam 10 carried by the fan shaft 11 which periodically imparts shocks to the adjoining wall of the powder container, is made as illustrated by Figs. 5 to 7.

Said cam is carried by a nut 51, preferably of small height, screwed on shaft 11 and a lock nut 52 is also screwed on said shaft 11, said nut 52 being provided with a bore 53 in eccentric position, acting as housing for a ball 54 which cannot escape from said hole due to a restriction of the orifice thereof.

Ball 54 is pushed against this orifice, and preferably, as shown by the drawing, Fig. 6, I provide in hole 53 several other balls 54a, 54b, two for instance, which constitute a reserve of fresh balls for replacement of ball 54 when the latter is worn.

Cam 12, carried by the wall of box 1, is constituted in the same manner, shaft 11 being replaced in this case by a screw 55 extending through said wall, opposite shaft 11.

Thus, on every revolution of shaft 11, the two projecting balls of the cams come into contact and cam 12 is suddenly pushed toward the box.

According to another feature of my invention, I fit the outflow orifice 3 provided in the bottom of box 1 with a sieve 56, Fig. 5. I provide a set of such sieves having meshes of different sizes to correspond with the various grades or kinds of powders that may be employed. This sieve stops lumps of powder or foreign materials which, otherwise, would come to clog, at least partly, the passage under shutter 5.

In this construction, the fan casing is provided, on one side thereof, with a circular opening, upon the edge 68 of which is tightly secured a closing plate 67 which includes an air intake tube 66. Box 1 is carried by said plate 67.

The device according to my invention is particularly advantageous, because it is simple, little expensive, and of light weight.

Light metals or alloys may of course be utilized for making the various elements of the system.

Of course, the stream of air for conveying the powder can be obtained through any suitable means, source of compressed air, piston pump, or atomizer, an example of which is given by the fan shown by the drawings.

The powder can be projected at a greater height than shown, for instance on trees, for destruction of caterpillars or other insects on the trees, in particular pine trees.

In a general manner, while I have, in the above description, disclosed what I deem to be practical and efficient embodiments of the present invention, it should be well understood that I do not wish to be limited thereto as there might be changes made therein without departing from the principle of the invention as comprehended within the scope of the appended claims.

What I claim is:

1. An apparatus which comprises a fan provided with an outlet and an air inlet opening laterally into said fan, means for feeding a powdery material to said inlet, said feeding means including a portion resiliently movable laterally with respect to the shaft of said fan, and a device for imparting repeated shocks to said portion of the feeding means, said device including a rigid longitudinal thrust receiving member carried by said portion of the feeding means in eccentric position with respect to the axis of said shaft and a longitudinal thrust member eccentrically carried by said shaft to strike said first mentioned member on every revolution of said shaft so as to push said first mentioned member in a direction away from the shaft axis.

2. An apparatus which comprises a fan provided with an outlet and an air inlet opening laterally into said fan, means for feeding a powdery material to said inlet, said feeding means including a portion resiliently movable laterally with respect to the shaft of said fan, and a device for imparting repeated shocks to said portion of the feeding means, said device including a rigid thrust receiving member carried by said portion of the feeding means in eccentric position with respect to the axis of said shaft, a housing carried by said shaft in eccentric position with respect thereto, and a ball in said housing projecting therefrom in the longitudinal direction to strike said member on every revolution of said shaft so as to push said member in a direction away from the shaft axis.

3. An apparatus which comprises a fan provided with an outlet and an air inlet opening laterally into said fan, means for feeding a powdery material to said inlet, said feeding means including a portion resiliently movable laterally with respect to the shaft of said fan, and a device for imparting repeated shocks to said portion of the feeding means, said device including a housing carried by said portion of the feeding means in eccentric position with respect to the axis of said shaft, a ball in said housing projecting longitudinally therefrom toward said fan, a housing carried by said shaft in eccentric position with respect thereto, and a ball in said last mentioned housing projecting therefrom longitudinally to strike said first mentioned ball on every revolution of said shaft so as to push said first mentioned ball in a direction away from the shaft axis.

4. An apparatus which comprises, in combination, a fan provided with an outlet and an air inlet opening laterally into said fan, and including a fan casing and a horizontal shaft journalled in said casing, a container for a powdery material communicating at the bottom part thereof with said inlet of said fan, said container having a flexible side wall secured at at least one point thereof to said fan casing, and a device for imparting repeated shocks to said wall, said device including a rigid longitudinal thrust receiving member carried by said portion of the feeding means in eccentric position with respect to the axis of said shaft and a longitudinal thrust member eccentrically carried by said shaft to strike said first mentioned member on every revolution of said shaft so as to push said first mentioned member in a direction away from the shaft axis.

5. An apparatus which comprises, in combination, a fan provided with an outlet and an air inlet opening laterally into said fan, and including a fan casing and a horizontal shaft journalled in said casing, a container for a powdery material communicating at the bottom part thereof with said inlet of said fan, said container having a flexible side wall secured at the top part thereof to said casing, and a device for imparting repeated shocks to said wall, said device including a rigid longitudinal thrust receiving member carried by said portion of the feeding means in eccentric position with respect to the axis of said shaft and a longitudinal thrust member eccentrically carried by said shaft to strike said first mentioned member on every revolution of said shaft so as to push said first mentioned member in a direction away from the shaft axis and spring means for urging the bottom part of said side wall longitudinally toward said thrust member.

VALÈRE GAËTAN ROBERT ALLIENNE.

REFERENCES CITED

The following references are of record in the file of this patent:

UNITED STATES PATENTS

| Number | Name | Date |
|---|---|---|
| 452,150 | Wetherbee | May 12, 1891 |
| 916,728 | Leggett | Mar. 30, 1909 |
| 988,979 | Cragg | Apr. 11, 1911 |
| 1,045,217 | Thomas | Nov. 26, 1912 |
| 1,137,085 | Riddle | Apr. 27, 1915 |
| 1,280,110 | Slate et al. | Sept. 24, 1918 |
| 1,337,619 | Pipe | Apr. 20, 1920 |
| 1,458,424 | Lemons | June 12, 1923 |
| 1,473,165 | Steigmeyer | Nov. 6, 1923 |
| 1,566,800 | MacArthur | Dec. 22, 1925 |
| 1,698,436 | Hendrickson | Jan. 8, 1929 |
| 1,724,319 | Schunemann | Aug. 13, 1929 |
| 1,948,668 | Kuchler | Feb. 27, 1934 |
| 2,029,173 | Jesser | Jan. 28, 1936 |
| 2,132,727 | Foote | Oct. 11, 1938 |
| 2,288,569 | Mason et al. | June 30, 1942 |

FOREIGN PATENTS

| Number | Country | Date |
|---|---|---|
| 712,877 | France | Oct. 14, 1931 |